United States Patent [19]

Naganawa et al.

[11] Patent Number: 4,765,820

[45] Date of Patent: Aug. 23, 1988

[54] METHOD OF MAKING CERAMIC ARC TUBE FOR HIGH-PRESSURE METAL-VAPOR DISCHARGE LAMP

[75] Inventors: Hitoshi Naganawa, Kasugai; Kouichiro Maekawa, Ichinomiya, both of Japan

[73] Assignee: NGK Insulators Ltd., Japan

[21] Appl. No.: 5,119

[22] Filed: Jan. 20, 1987

[30] Foreign Application Priority Data

Jan. 21, 1986 [JP] Japan ................................ 61-10637

[51] Int. Cl.[4] ............................................ C03B 23/20

[52] U.S. Cl. ......................................... 65/36; 65/42; 313/493

[58] Field of Search ................ 65/36, 42, 43; 313/493

[56] References Cited

U.S. PATENT DOCUMENTS

| | | | |
|---|---|---|---|
| 2,204,217 | 6/1940 | Herriger | 65/42 X |
| 2,324,385 | 7/1943 | Gustin et al. | 65/42 X |
| 3,239,323 | 3/1966 | Folweiler | 65/43 X |
| 3,660,063 | 5/1972 | Christopher | 65/36 |
| 4,162,151 | 7/1979 | Bhalla | 65/42 |

FOREIGN PATENT DOCUMENTS 50-30384 9/1975 Japan .

*Primary Examiner*—Robert L. Lindsay

*Attorney, Agent, or Firm*—Parkhurst & Oliff

[57] ABSTRACT

A process of producing a ceramic arc tube for a high-pressure metal-vapor discharge lamp, including a translucent ceramic tube, and at least one end cap which closes corresponding at least one end of the ceramic tube and which supports a discharge electrode. A green ceramic tubular body which gives the ceramic tube is formed of a first ceramic material, whereas at least one green end cap which gives the at least one end cap is formed of a second ceramic material of a same kind as the first ceramic material. Each green end cap has a cylindrical portion, and a flange portion which extends radially outwardly from one of opposite axial ends of an outer circumferential surface of the cylindrical portion. The cylindrical portion of each green end cap is inserted and positioned in a corresponding end portion of the green ceramic tubular body, such that the flange portion abuts on an end face of the corresponding end portion of the green ceramic tubular body. The thus assembled bodies are subjected to a firing operation to obtain the ceramic arc tube wherein crystal constitution of the ceramic tube and the at least one end cap are integrated with each other.

13 Claims, 2 Drawing Sheets

METHOD OF MAKING CERAMIC ARC TUBE FOR HIGH-PRESSURE METAL-VAPOR DISCHARGE LAMP

BACKGROUND OF THE INVENTION

1. Field of the Invention

The present invention relates generally to a process for producing a ceramic arc tube for use in a high-pressure metal-vapor discharge lamp, and more particularly to a process suitable for producing a ceramic arc tube for such a discharge lamp with high dimensional accuracy, which arc tube includes a translucent ceramic tube, wherein at least one of opposite ends of the ceramic tube is closed by a ceramic end cap that supports a discharge electrode.

2. Discussion of the Prior Art and Problem Solved by the Invention

In a known high intensity discharge lamp (hereinafter referred to as "HID lamp") such as sodium lamps and metal-halide lamps, a translucent arc tube (which forms a body of an arc tube of the lamp) is formed from a ceramic tube having high corrosion resistance and high light transmissivity, in particular, a translucent alumina tube. The opposite ends of such a translucent ceramic arc tube are closed by ceramic end caps which support respective discharge electrodes made of tungsten or molybdenum.

There is known a process for fabricating such an enclosed ceramic arc tube having a translucent ceramic tube closed at their opposite ends by respective ceramic end caps as indicated above. An example of such a process is disclosed in Toku-Ko-Sho No. 50-30384 (Publication for opposition purpose in 1975) of Japanese Patent Application. According to the process disclosed therein, end plate blanks giving the ceramic end caps and a tubular blank giving the ceramic arc tube are subjected to respective preliminary firing operations at comparatively low temperatures, in order to burn out organic substances included in the blanks. Then, the fired end plate blanks are fitted into the opposite ends of the fired tubular blank, and a thus obtained assembly of the end plate blanks and the tubular blank is subjected to a secondary firing operation at a relatively high temperature in the neighborhood of 1900° C. As a result of the secondary firing operation, the tubular blank is made translucent, and the fired end plate blanks are secured integrally to the tubular blank due to a difference in the shrinkage between the end plate and tubular blanks during the secondary firing.

In the conventional fabrication process described above, the fitting of the end plate blanks into the tubular blank is conducted after these blanks have been hardened by the preliminary firing. Hence, gaps may arise at the interface of the end plate blanks and the tubular blank after the assembly is subjected to the secondary firing. Thus, the ceramic arc tube fabricated by the conventional process may suffer form leakage of a gas through such gaps.

The end plate blanks conventionally used for the end caps usually take the form of a ring-like disc adapted to engage the open ends of the tubular blank for the ceramic arc tube. These disc blanks are difficult to be positioned relative to the tubular blank with consistent accuracy. Further, the disc blanks fitted in the tubular blank may be dislocated or displaced relative to the tubular blank, during transportion or handling of the assembly of the disc and tubular blanks, or due to the vibrations, or impacts thereto during transportation of the assembled blanks to and from a firing furnace. Such dislocation or displacement may lower the dimensional accuracy of the obtained ceramic arc tube, i.e., may result in a large variation or fluctuation in the distance between the discharge electrodes supported by the end caps, causing a problem of reduced discharging stability of the metals filling the arc tube. To solve this problem, the conventional process employs grinding of the end portions of the fired translucent ceramic arc tube, for reducing the possible dimensional variations to within predetermined tolerances. However, such a grinding step is cumbersome, and is not effective to correct a variation in the distance between the inner surfaces of the end caps.

SUMMARY OF THE INVENTION

It is therefore an object of the present invention, which was developed in the light of the above situations in the prior art, to provide a process suitable for manufacturing a ceramic arc tube including a translucent ceramic tube and at least one ceramic end cap closing corresponding to at least one end of the translucent ceramic tube, which process permits a highly reliable gas-tight fitting of the ceramic end cap into the corresponding end of the ceramic tube.

Another object of the present invention is the provision of such a process which ensures accurate positioning of the ceramic end cap or caps relative to the translucent ceramic tube, thereby assuring consistently accurate dimensions of the ceramic arc tube, such as a distance between oppositely located discharge electrodes disposed at the opposite ends of the ceramic tube.

According to the present invention, there is provided a process of manufacturing a ceramic arc tube for a high-pressure metal-vapor discharge lamp, including a translucent ceramic tube, and at least one end cap which closes a corresponding at least one end of the ceramic tube and which supports a discharge electrode, comprising the steps of: forming a green ceramic tubular body of a first ceramic material, which gives the ceramic arc tube; forming at least one green end cap of a second ceramic material of a same kind as the first ceramic material, which gives the above-indicated at least one end cap, each of the at least one green end cap including a cylindrical portion, and a flange portion which extends radially outwardly from one of opposite axial ends of an outer circumferential surface of the cylindrical portion; positioning the cylindrical portion of the each green end cap in a corresponding end portion of the green ceramic tubular body, such that the flange portion abuts on an end face of the corresponding end portion of the green ceramic tubular body; and subjecting an assembly of the green ceramic tubular body and the at least one green end cap, to a firing operation to obtain the ceramic arc tube wherein crystal constitution of the ceramic tube and the at least one end cap are integrated with each other.

In the process of the present invention as described above, each green end cap for each end cap which closes the corresponding end of the ceramic tube, has the cylindrical portion fitted in the end portion of the green ceramic tubular body giving the ceramic tube, and further has the flange portion at the end of the cylindrical portion. The axial position of the green end cap relative to the green ceramic tubular body, that is, the distance of engagement of the cylindrical portion with the end portion of the green ceramic tubular body is consistently precisely determined by the abutting contact of the flange portion with the corresponding end face of the green ceramic tubular body. Therefore, the integral one-piece ceramic arc tube obtained by firing the assembly of the tubular body and end cap has highly consistent dimensional accuracy, in particular, in respect of the distance between the discharge electrodes at least one of which is fixed to the corresponding at least one end cap. Accordingly, the discharging stability of the electrodes is effectively improved, without the conventionally required grinding of the fired ceramic tube, and dimensional adjustment during installation of the discharge electrodes. Further, the instant process provides a considerable improvement in the gas-tightness at the interface between the ceramic tube and the end cap or caps. These are industrially significant advantages offered by the present invention.

According to one feature of the present invention, the first ceramic material for the green ceramic tubular body has a greater firing shrinkage than the second ceramic material for the at least one green end cap, so that the bonding between the green ceramic tubular body and the green end cap is effected under a contact pressure due to the difference in the amount of their shrinkage during the firing operation, so as to provide increased gas-tightness at the interface of the bodies, and more effective integration of the bodies into the one-piece arc tube.

More specifically, the difference in an amount of radial shrinkage upon the firing operation between the green ceramic tubular body and the at least one green end cap is greater than a radial clearance between an inner surface of the green ceramic tubular body and an outer surface of the cylindrical portion of each green end cap before the green bodies are subjected to the firing operation.

According to an advantageous feature of the invention, the first and second ceramic materials for the green ceramic tubular body and each green end cap consist of highly pure $\alpha$-alumina powders, respectively. In this case, the unfired assembly of the green ceramic tubular body and each green end cap formed of the $\alpha$-alumina powders is preferably subjected to the firing operation which consists of a preliminary firing step effected in an oxidizing atmosphere, and a secondary firing step effected in a reducing or vacuum atmosphere. Thus, the desired ceramic arc tube with the ceramic tube at least one end of which is closed by the ceramic end cap, is produced. For effective integration of the crystal constitution of the ceramic tube and the ceramic end cap or caps at their interface, it is preferred that the highly pure $\alpha$-alumina powder of the first ceramic material for the green ceramic tubular body has a higher percentage of shrinkage upon the preliminary firing step, than the highly pure $\alpha$-alumina powder of the second ceramic material for each green end cap.

BRIEF DESCRIPTION OF THE DRAWINGS

The above and optional objects, features and advantages of the present invention will be better understood by reading the following description of a preferred embodiment of the invention, when considered in connection with the accompanying drawings, in which.

DETAILED DESCRIPTION OF THE INVENTION

To further clarify the principle of the present invention, the preferred embodiment of the invention will be described in detail, by reference to the accompanying drawings.

Figure 1A:
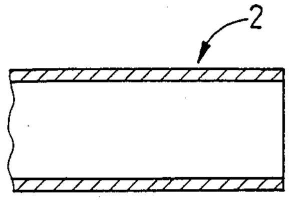
FIGS. 1(*a*) and 1(*b*) are schematic elevational views in cross section of a green ceramic tubular body and green end cap, respectively, used according to one embodiment of the invention.
Figure 1B:
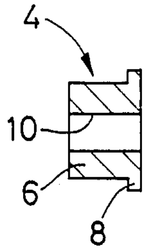

Referring first to FIG. 1, reference numberal 2 designates a green ceramic tubular body having a predetermined length, while reference numeral 4 designates a generally cylindrical end-cap green body (hereinafter called "green end cap") including a cylindrical portion 6, and a flange portion 8 which extends radially outwardly from one end of the outer circumferential surface of the cylindrical portion 6. These green ceramic tubular body and green end cap 2, 4 are formed of ceramic materials of the same kind, by press molding or another forming technique commonly practiced in the art. The green end cap 4 has an electrode hole 10 in its central portion, for accommodating and fixing a discharge electrode therein. The cylindrical portion 6 of the green end cap 4 has an outside diameter which is slightly smaller than the inside diameter of the green ceramic tubular body 2. Described more precisely, the outside diameter of the cylindrical portion 6 is determined so that a radial clearance between the outer surface of the cylindrical portion 6 and the inner surface of the green ceramic tubular body 2 before preliminary firing thereof in substantially equal to or slightly smaller than a difference in the amount of radial shrinkage upon the preliminary firing operation between the green ceramic tubular body 2 and the green end cap 4. While the green ceramic tubular body 2 used in this specific example takes the form of a simple cylinder, the tubular body 2 may take other forms. For instance, the intermediate portion of the tubular body 2 may be radially outwardly expanded by a suitable amount.

As suggested above, the ceramic materials for the green ceramic tubular body 2 and the green end cap 4 are generally selected to provide a difference in their firing shrinkage. That is, the ceramic material for the green ceramic tubular body 2 has a higher firing shrinkage than that for the green end cap 4, so that the surface of the green end cap 4 fitted in the end portion of the green ceramic tubular body 2 is brought into tight contact with the mating surface of the green ceramic tubular body 2, and so that the green end cap 4 is firmly and tightly secured or bonded to the end portion of the tubular body 2.

Any ceramic materials used for a ceramic arc tube for conventional HID lamps may be used for forming the green ceramic tubular body 2 and the green end cap 4. However, highly pure $\alpha$-alumina powders are particularly advantageously used in the present invention so that the ceramic arc tube has high corrosion resistance and high light transmissivity. As indicated above, the α-alumina powder for forming the green ceramic tubular body 2 must have a higher percent of shrinkage upon preliminary firing operation, than the α-alumina powder used for forming the green end cap 4.

Figure 5:
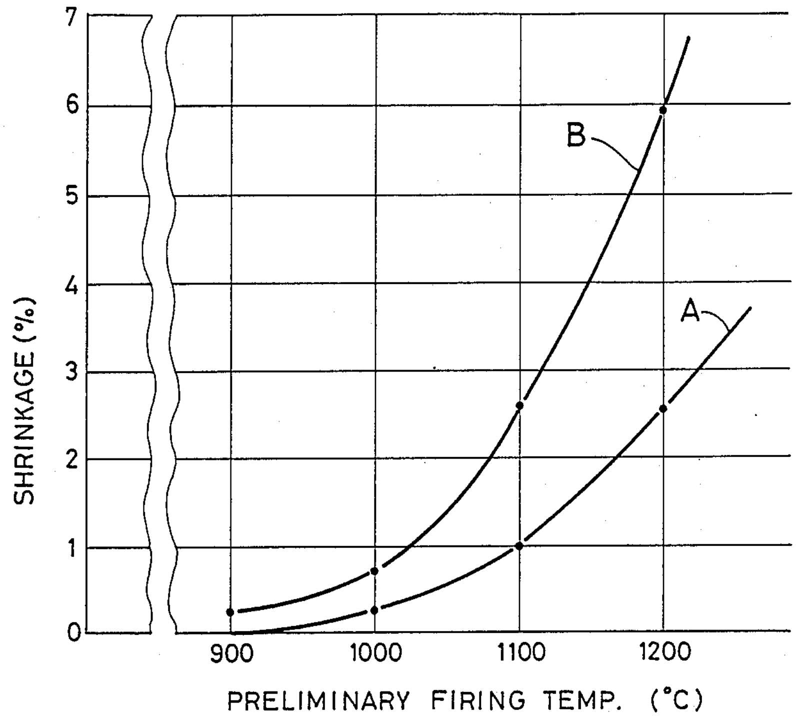
FIG. 5 is a graph showing examples of firing shrinkage percentages of highly pure $\alpha$-alumina powders upon preliminary firing thereof, suitably used in the present invention.

Described more specifically referring to FIG. 5, the α-alumina powered used for the green end cap 4 has a comparatively low preliminary shrinkage as indicated at (A) in FIG. 5, wherein the firing shrinkage percentage is indicated in relation to the preliminary firing temperature. For example, the green end cap 4 is formed from an α-alumina powder which has a specific surface of 2 $m^2/g$, giving a relatively low sintering activity. The thus selected α-alumina powder is formed under a compacting pressure of 2–3 $t/cm^2$, into the generally cylindrical green end cap 4 having the radial flange 8, as depicted in FIG. 1(*b*). On the other hand, the α-alumina powder for the green ceramic tubular body 2 has a higher preliminary shrinkage percent than the powder for the green end cap 2, as indicated at (B) in the graph of FIG. 5. For example, the green ceramic tubular body 2 is press-formed from a commercially available α-alumina powder which has a specific surface of 5 $m^2/g$, giving a relatively high sintering activity. This second α-alumina powder is press-formed under a compacting pressure of 2–3 $t/cm^2$, into the green ceramic tubular body 2 having the predetermined length.

Figure 2:
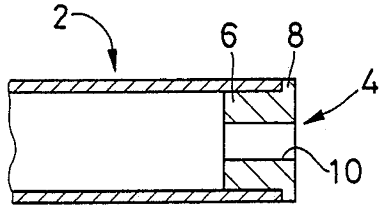
FIG. 2 is a schematic elevational view of an assembly of the green ceramic tubular body and the green end cap fitted in an end portion of the tubular body.

The thus prepared unfired or green end cap 4 is attached to at least one of the opposite end portions of the similarly prepared unfired green ceramic tubular body 2, such that the cylindrical portion 6 of the cap 4 is fitted or positioned in the bore of the tubular body 2, with the flange 8 abutting on the end face of the tubular body 2, as illustrated in FIG. 2. Since the green end cap 4 is inserted into the end portion of the green ceramic tubular body 2 until the flange 8 comes into abutting contact with the end face of the tubular body 2, the green end cap 4 can be consistently accurately positioned relative to any green ceramic tubular body 2 in the longitudinal direction of the tubular body. In other words, the abutting contact of the green end caps 4 with the end face of the tubular body 2 assures a minimum variation in the longitudinal position of the inner extremity of the green end cap 4 relative to the tubular body 2.

Figure 3:
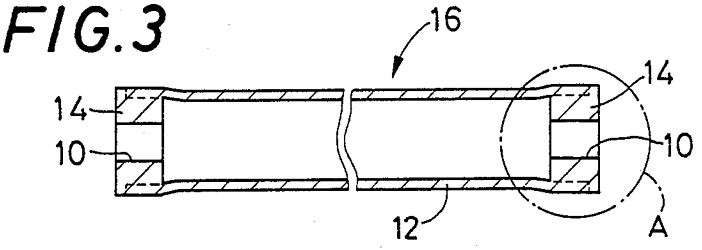
FIG. 3 is a schematic elevational view of a ceramic arc tube which is produced by firing the green end caps fitted in the opposite end portions of the green ceramic tubular body, as depicted in FIG. 2.
Figure 4:
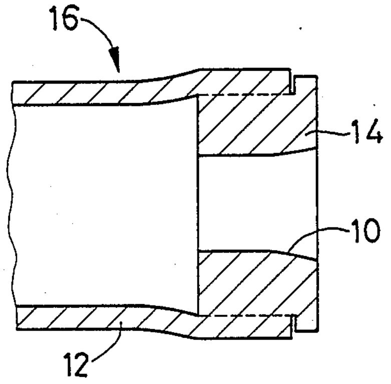
FIG. 4 is a fragmentary view in enlargement of an end portion of the ceramic arc tube indicated at A in FIG. 3.

The green ceramic tubular body 2, and the green end cap 4 fitted in at least one of the opposite open end portions of the green ceramic tubular body 2 as described above, are subjected to an ordinary firing operation, during which a sintering reaction effectively occurs between the tubular body 2 and the green end cap or caps 4, whereby the tube and green end caps 2, 4 are integrated into a one-piece ceramic arc tube 16, as shown in FIGS. 3 and 4. The ceramic arc tube 16 consists of a translucent ceramic tube 12 obtained from the tubular body 2, and an end cap or caps 14 obtained from the green end cap or caps 4. In the thus obtained one-piece ceramic arc tube 16, an interface between the ceramic tube 12 and the end cap 14 is difficult to be perceived.

The firing operation of the assembly of the green bodies 2, 4 generally consists of a preliminary firing step for removing or burning out organic substances such as a binder and a plasticizer contained in the ceramic materials for forming the bodies 2, 4, and a secondary firing step for sintering the bodies 2, 4 into the integral arc tube 16. The preliminary firing step is conducted in air or other oxidizing atmospheres at a relatively low temperature, whereas the secondary firing step is effected in a reducing atmosphere at a temperature higher than the preliminary firing temperature.

For instance, where the green ceramic tubular body 2 and the green end cap or caps 4 are formed of highly pure α-alumina powders, the preliminary firing is effected in air at a temperature of 900°–1100° C. Since the sintering activity and consequently the preliminary firing shrinkage of the α-alumina powder for the green end cap 4 are selected to be smaller than those of the α-alumina powder for the green ceramic tubular body 2, the green end cap 4 is radially compressed by the green ceramic tubular body 2, and therefore the bodies 4, 2 are effectively bonded to each other under pressure, as the preliminary firing proceeds. According to the present embodiment wherein the green end cap 4 has the configuration as shown, the preliminary firing operation may be accomplished while the green ceramic tubular body 2 with the green end cap or caps 4 fitted therein is positioned upright, with its axis held in the vertical direction. This firing posture is effective to prevent the green end cap 4 from being separated from the green ceramic tubular body 2 during transportion or handling of the assembled bodies 2, 4, or due to vibration of the green bodies or shock thereto during transportion of the assembled bodies to and from a firing furnace.

The assembly of the green bodies 2, 4, which have been subjected to the preliminary firing step is then subjected to the secondary firing step conducted in a reducing atmosphere at a comparatively high temperature in the neighborhood of 1900° C. As a result of this secondary firing, the tube and green end caps 2, 4 are made translucent and are integrated at their interface into the ceramic arc tube 16 for a HID lamp, wherein the crystal constitution at the connection of the translucent ceramic tube 12 and the ceramic end cap 14 are gas-tightly bonded to each other 14.

Portion A of the ceramic arc tube 16 of FIG. 3 is shown in enlargement in the cross sectional view of FIG. 4, which indicates a gap between the end face of the ceramic tube 12 and the flange 8 of the end cap 14. This gap is created due to a difference in the amount of shrinkage of the green bodies 2, 4 in their axial direction during the secondary firing operation. However, a variation in the axial gap between the individual ceramic arc tubes 16 is very small, usually 0.02 mm or less, and therefore a corresponding variation in the distance between the inner ends of the opposite end caps 14, 14 is accordingly small.

In the above-described process for fabricating the ceramic arc tube 16 for a HID lamp, the green end cap or caps 4 is/are accurately positioned relative to the green ceramic tubular body 2 by means of abutting engagement of the flange 8 with the corresponding end face of the tube 2. Further, the flange 8 contributes to preventing the end cap or caps 4 from being dislocated relative to the green ceramic tubular body 2 due to vibration of the green bodies or shock thereto during handling or transportion of the assembled bodies, before the assembly is fired into the arc tube 16. Thus, the present process ensures a minimum variation in the distance between the two end caps 14, 14 at the opposite ends of the ceramic tube 12, or between the end cap 14 at one end of the tube 12 and another end cap at the other end of the tube 12. Therefore, a variation between the opposite inner surfaces of the end caps is accordingly minimized. Hence, the individual ceramic arc tubes 16 manufactured according to the instant process have a substantially constant distance between the discharge electrodes supported by the opposite end caps, assuring stable discharges between the electrodes.

The instant process for a ceramic arc tube, which permits highly accurate positioning of the end caps relative to the ceramic tube as described above, has completely eliminated the conventionally required, time-consuming grinding of the end portions of the fired ceramic tube. The instant process has further eliminated the use of a special jig for exact positioning of the electrodes in the electrode holes in the ceramic end caps, upon sealing of the ceramic tube with a suitable sealing frit.

In the process of the present invention, the assembling of the green ceramic tubular body 2 and the green end cap 4 is effected before these bodies 2, 4 are fired. This pre-firing assembly facilitate mutual structural accommodations and a close fit of the bodies 2, 4, which ensures a better structural bond between the bodies 2, 4, and an improved degree of gas-tightness at the interface of the bodies.

In the illustrated process, the ceramic material for the green ceramic tubular body 2 and the ceramic material for the green end cap 4 have different firing shrinkage percentages, as discussed above. More particularly, the $\alpha$-alumina powder used for the green ceramic tubular body 2 has a greater value of shrinkage upon the preliminary firing, than the $\alpha$-alumina powder used for the green end cap 4, so that the bonding or adhesion between the green end cap 4 and the corresponding end portion of the green ceramic tubular body 2 may be effectively achieved under pressure, for better sintering reaction at the bonding surfaces and consequent integration or coherence of their crystal constitution, which provide a perfectly gas-tight bond at the interface between the ceramic tube 12 and the ceramic end cap 14. This shrinkage bonding during the preliminary firing permits cohesion of the bodies 2, 4 with high relative positioning accuracy, without fixing the green end cap 4 tubular body 2 by using a special jig. Thus, the distance between the end caps at the opposite ends of the ceramic tube may be precisely controlled.

The ceramic arc tube for a HID lamp, produced according to the present invention, is equipped at its opposite ends with suitable discharge electrodes, which are secured in a known manner. For instance, where the arc tube 16 has the two integrally formed ceramic end caps 14, 14 at its opposite ends, as depicted in FIG. 3, the discharge electrodes are partially inserted through the electrode holes 10, 10 formed in the end caps 14, 14, and are set in position with a suitable sealing material. In the meantime, the arc tube 16 is charged with a suitable luminous metal, a compound thereof, or a suitable gas or a mixture of gases. In the case where only one of the opposite ends of the ceramic tube 12 is closed by the integral end cap 14, a suitable electrode is partially inserted and positioned in the end cap 14, whereas the other end of the ceramic tube 12 is closed by another suitable end cap equipped with another electrode. In this case, too, the arc tube is charged with a suitable fill as indicated above.

While the present invention has been described in its preferred embodiment with a certain degree of particularity, it is to be understood that the invention is not limited to the precise details of the illustrated embodiment, but the invention may be otherwise embodied with various changes, modifications and improvements, which may occur to those skilled in the art, without departing from the scope of the invention defined in the following claims.

What is claimed is:

1. A process of producing a ceramic arc tube for a high-pressure metal-vapor discharge lamp, including a translucent ceramic tube, and at least one end cap which closes a corresponding at least one end of the ceramic tube and which supports a discharge electrode, comprising the steps of:

forming a green ceramic tubular body of a first ceramic material, which gives said ceramic tube;

forming at least one green end cap of a second ceramic material of a same kind as said first ceramic material, which gives said at least one end cap, each of said at least one green end cap including a cylindrical portion, and a flange portion which extends radially outwardly from one of opposite axial ends of an outer circumferential surface of said cylindrical portion;

positioning said cylindrical portion of said each green end cap in a corresponding end portion of said green ceramic tubular body, such that said flange portion abuts on an end face of said corresponding end portion of said green ceramic tubular body; and subjecting an assembly of said green ceramic tubular body and said at least one green end cap to a firing operation to obtain said ceramic arc tube wherein crystal constitutions of said ceramic tube and said at least one end cap are integrated with each other.

2. A process according to claim 1, wherein said first ceramic material for said green ceramic tubular body has a greater firing shrinkage than said second ceramic material for said at least one green end cap.

3. A process according to claim 1, wherein said first and second ceramic materials for said green ceramic tubular body and said at least one green end cap consist of highly pure $\alpha$-alumina powders, respectively.

4. A process according to claim 3, wherein said firing operation includes a preliminary firing step effected in an oxidizing atmosphere, and a secondary firing step effected in a reducing atmosphere.

5. A process according to claim 4, wherein the highly pure $\alpha$-alumina powder of said first ceramic material for said green ceramic tubular body has a higher percentage of shrinkage upon said preliminary firing step, than the highly pure $\alpha$-alumina powder of said second ceramic material for said at least one green end cap.

6. A process according to claim 2, wherein a difference in an amount of radial shrinkage upon the firing operation between said green ceramic tubular body and said at least one green end cap is greater than a radial clearance between an inner surface of said green ceramic tubular body and an outer surface of said cylindrical portion of said at least one green end cap before said green ceramic tubular body and said at least one green end cap are subjected to said firing operation.

7. A process for producing a ceramic arc tube for a high-pressure metal-vapor discharge lamp, including a translucent ceramic tube, and at least one end cap which closes a corresponding at least one end of the ceramic tube and which supports a discharge electrode, comprising the steps of:

forming a green ceramic tubular body of a first ceramic material, which provides said ceramic tube;

forming at least one green end cap of a second ceramic material of a same kind as said first ceramic material, which provides said at least one end cap, each of said at least one green end cap including a cylindrical portion, and a flange portion which extends radially outwardly from one of opposite axial ends of an outer circumferential surface of said cylindrical portion;

positioning said cylindrical portion of said each green end cap in a corresponding end portion of said green ceramic tubular body, such that said flange portion abuts on an end face of said corresponding end portion of said green ceramic tubular body; and subjecting an assembly of said green ceramic tubular body and said at least one green end cap to a firing operation, said firing operation including a preliminary firing step at a temperature within a first temperature range and a secondary firing step at a temperature within a second temperature range, said second range being higher than said first range, so as to obtain said ceramic arc tube wherein crystal constitutions of said ceramic tube and said at least one end cap are integrated with each other.

8. A process according to claim 7, wherein said first ceramic material for said green ceramic tubulr body has a greater firing shrinkage than said second ceramic material for said at least one green end cap.

9. A process according to claim 7, wherein said first ceramic material for said green ceramic tubular body has a greater firing shrinkage during said preliminary firing step than said second ceramic material for said at least one green end cap.

10. A process according to claim 7, wherein said first and second ceramic materials for said green ceramic tubular body and said at least one green end cap consist of highly pure α-alumina powders, respectively.

11. A process according to claim 10, wherein said preliminary firing step is preformed in an oxidizing atmosphere, and said secondary firing step is performed in a reducing atmosphere.

12. A process according to claim 11, wherein the highly pure α-alumina powder of said first ceramic material for said green ceramic tubular body has a higher percentage of shrinkage upon said preliminary firing step, than the highly pure α-alumna powder of said second ceramic material for said at least one green end cap.

13. A process according to claim 8, wherein a difference in an amount of radial shrinkage upon the firing operation between said green ceramic tubular body and said at least one green end cap is greater than a radial clearance between an inner surface of said green ceramic tubular body and an outer surface of said cylindrical portion of said at least one green end cap before said green ceramic tubular body and said at least one green end cap are subjected to said firing operation.

* * * * *